(12) United States Patent  
Campbell

(10) Patent No.: US 6,490,458 B1  
(45) Date of Patent: Dec. 3, 2002

(54) PORTABLE PHONE BANK

(75) Inventor: David N. Campbell, Carlisle, MA (US)

(73) Assignee: Verizon Laboratories Inc., Waltham, MA (US)

( * ) Notice: Subject to any disclaimer, the term of this patent is extended or adjusted under 35 U.S.C. 154(b) by 0 days.

(21) Appl. No.: 09/334,487

(22) Filed: Jun. 16, 1999

(51) Int. Cl.⁷ ............................................... H09Q 7/20
(52) U.S. Cl. ..................... 455/463; 455/465; 455/914; 379/153; 379/144.05
(58) Field of Search ............................. 455/3.01, 3.02, 455/3.03, 3.04, 403, 414, 421, 426, 462, 463, 465; 379/143, 144.02, 153, 91.01, 91.02, 194.05, 199.06

(56) References Cited

U.S. PATENT DOCUMENTS

| | | | | |
|---|---|---|---|---|
| 4,776,000 A | * | 10/1988 | Parienti | 379/62 |
| 4,953,198 A | | 8/1990 | Daly et al. | 379/61 |
| 5,046,183 A | * | 9/1991 | Dorst et al. | 370/264 |
| 5,193,216 A | * | 3/1993 | Dasvis | 455/67.7 |
| 5,272,747 A | * | 12/1993 | Meads | 379/59 |
| 5,285,443 A | * | 2/1994 | Patsiokas et al. | 370/280 |
| 5,327,482 A | * | 7/1994 | Yamamoto | 379/61 |
| 5,509,053 A | * | 4/1996 | Gowda et al. | 379/63 |
| 5,537,462 A | * | 7/1996 | Utter et al. | 379/102 |
| 5,604,920 A | * | 2/1997 | Bertiger et al. | 455/13.1 |
| 5,815,807 A | * | 9/1998 | Osmani et al. | 455/410 |
| 5,850,599 A | * | 12/1998 | Seiderman | 455/406 |
| 5,867,782 A | * | 2/1999 | Yoon | 455/421 |
| 6,038,227 A | * | 3/2000 | Farris et al. | 370/54 |
| 6,061,580 A | * | 5/2000 | Altschul et al. | 455/575 |
| 6,073,013 A | * | 6/2000 | Agre et al. | 455/428 |
| 6,112,077 A | * | 8/2000 | Spitaletta et al. | 455/407 |
| 6,278,863 B1 | * | 8/2001 | Mabrouki | 455/501 |

* cited by examiner

*Primary Examiner*—William Trost
*Assistant Examiner*—Congvan Tran
(74) *Attorney, Agent, or Firm*—Leonard Charles Suchyta; James K. Weixel

(57) ABSTRACT

A portable telephone bank includes a group of public telephones connected to a central communication unit. The public telephones permit callers to place telephone calls over a public telephone network. Each of the telephones includes a portable handset that permits a caller to roam within a predetermined range of the portable telephone bank. The central communication unit transmits communication signals from the telephones to the public telephone network via wireless communication channels.

23 Claims, 17 Drawing Sheets

320

900

PORTABLE PHONE BANK

FIELD OF THE INVENTION

The present invention relates generally to public communication systems and, more particularly, to a portable bank of cordless, wireless, or disposable public telephones.

BACKGROUND OF THE INVENTION

Public telephones have remained relatively static over the last decade. FIG. 1 is a diagram of a conventional bank of public telephones 100. The telephone bank 100 includes several telephone units 110. Each telephone unit 110 includes a housing 120, a handset 130 connected to the housing 120 via a cord or cable 140, a coin reception slot 150 that receives coins as payment for a call, a card reception slot 160 that receives a debit or credit card as payment for a call, and a coin return slot 170 that returns the coin payment in the event of incomplete placement of a call.

Typically, a provider permanently installs the telephone bank 100 at a predetermined location, such as at an airport or a shopping mall, or temporarily installs it at a location where temporary telephone service is needed, such as at a convention or a sporting event. The provider connects the telephone bank 100 to a public telephone line at the location.

One problem that exists with the conventional telephone bank 100 is that callers must congregate in the telephone area to wait for a telephone to become available and to place a call. The telephone cord 140 limits a caller's movement during the call to an area of usually less than a foot. The cord 140 also limits the telephone's use by callers who cannot comfortably reach the telephone handset 130, such as individuals in wheelchairs.

FIG. 2 is a diagram of a conventional bank of public telephones 200 that addresses the above problem. The telephone bank 200 includes several telephone units 210. Each telephone unit 210 includes a housing 220, a cordless handset 230, a coin reception slot 240 that receives coins as payment for a call, a card reception slot 250 that receives a debit or credit card as payment for a call, and a coin return slot 260 that returns the coin payment in the event of incomplete placement of a call. The cordless handset 230 permits a caller to roam outside the immediate area of the telephone bank 200.

Both of the above conventional telephone banks 100 and 200 have an additional problem in that they require a physical connection to a public telephone network. Also, the physical connection must be capable of handling the maximum telephone service provided by the telephone bank. As a result, providers are limited as to the locations at which these telephone banks can be installed, thereby limiting the availability of public telephone service.

Therefore, a need exists for a mechanism that provides public telephone service at any location, regardless of whether the location contains a physical connection to the public telephone network.

SUMMARY OF THE INVENTION

Systems and methods consistent with the present invention address this need by providing a portable bank of cordless, wireless, or disposable telephones that provide public telephone service at any location.

In accordance with the purpose of the invention as embodied and broadly described herein, a system consistent with the present invention includes a group of public telephones connected to a central communication unit. The public telephones permit callers to place telephone calls over a public telephone network. Each of the telephones includes a portable handset that permits a caller to roam outside an immediate area of the system. The central communication unit transmits communication signals from the telephones to the public telephone network via wireless communication channels.

In another implementation consistent with the present invention, a system includes at least one satellite, a gateway connected to the at least one satellite by a wireless communication channel and to the public telephone network by a wireline communication channel, and a portable public telephone bank. The portable telephone bank includes a plurality of public telephones and a central communication unit.

The public telephones permit callers to place telephone calls. Each of the public telephones includes a portable handset that permits a caller to roam within a predetermined range of the portable telephone bank. The central communication unit connects to the public telephones and the at least one satellite to transmit communication signals between the public telephones and the public telephone network via the at least one satellite and the gateway.

In a different implementation consistent with the present invention, the central communication unit transmits communication signals from the public telephones to a public telephone network via a high-speed data link.

In other implementations consistent with the present invention, the public telephones include cordless, wireless, or disposable handsets.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of the invention refers to the accompanying drawings. The same reference numbers in different drawings identify the same or similar elements. Also, the following detailed description does not limit the invention. Instead, the scope of the invention is defined by the appended claims.

Systems and methods consistent with the present invention offer public telephone portability by providing public telephone service to locations that were conventionally incapable of providing such service.

EXEMPLARY PUBLIC TELEPHONE BANK

Figure 1:
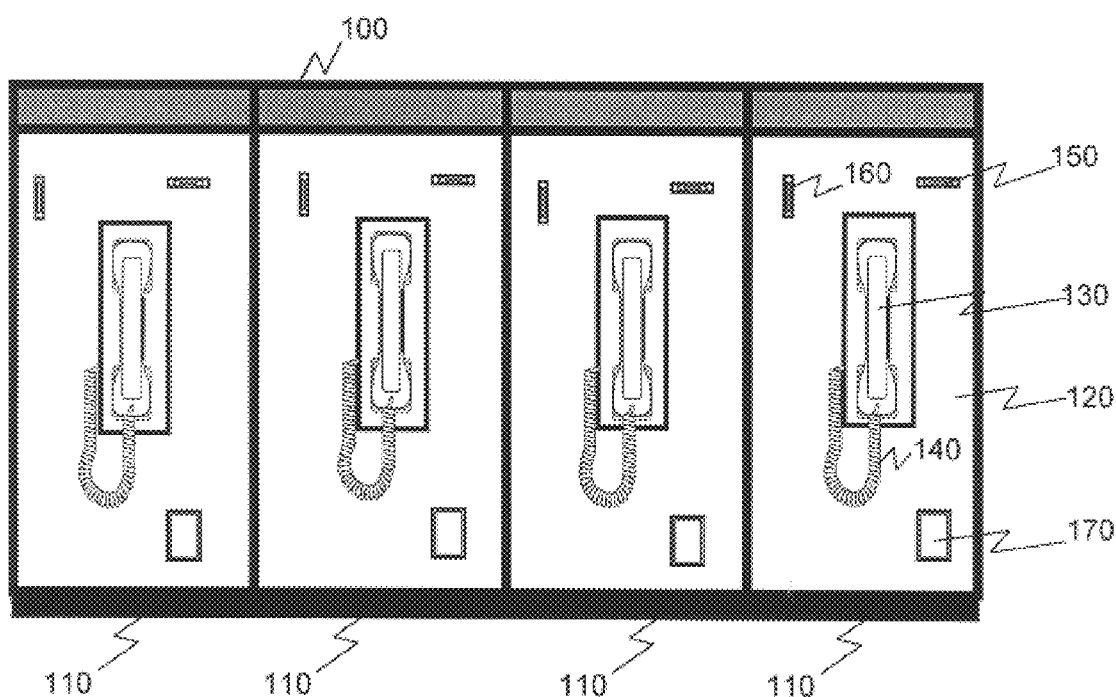
FIG. 1 is a diagram of a conventional bank of public telephones.
Figure 2:
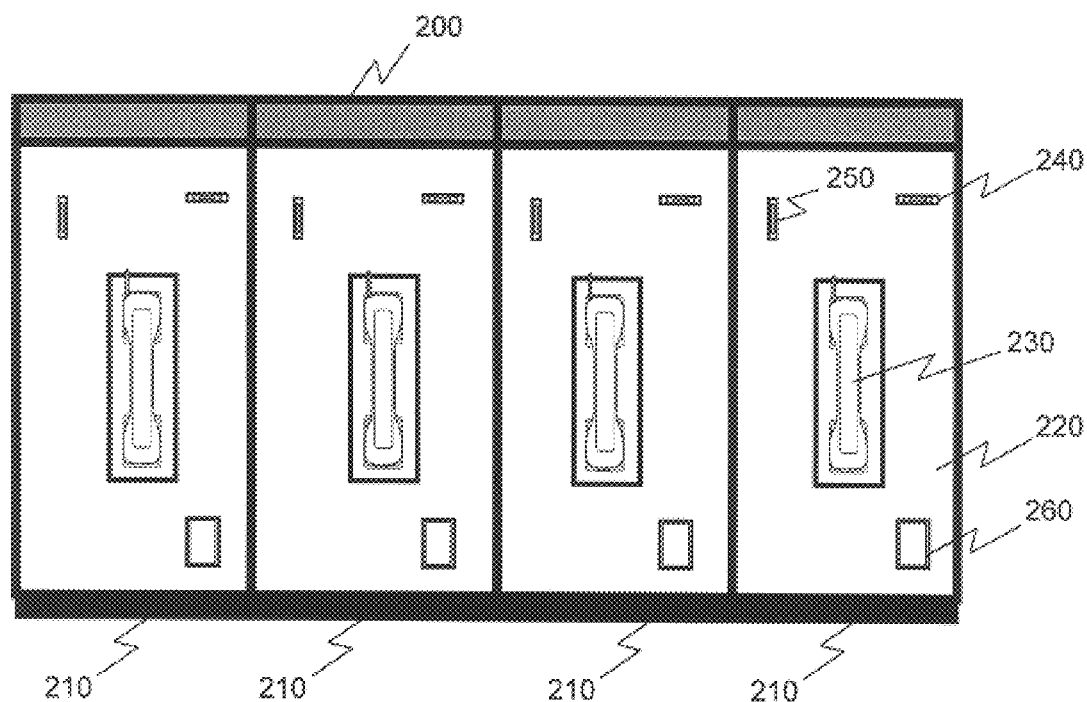
FIG. 2 is a diagram of another conventional bank of public telephones.
Figure 3:
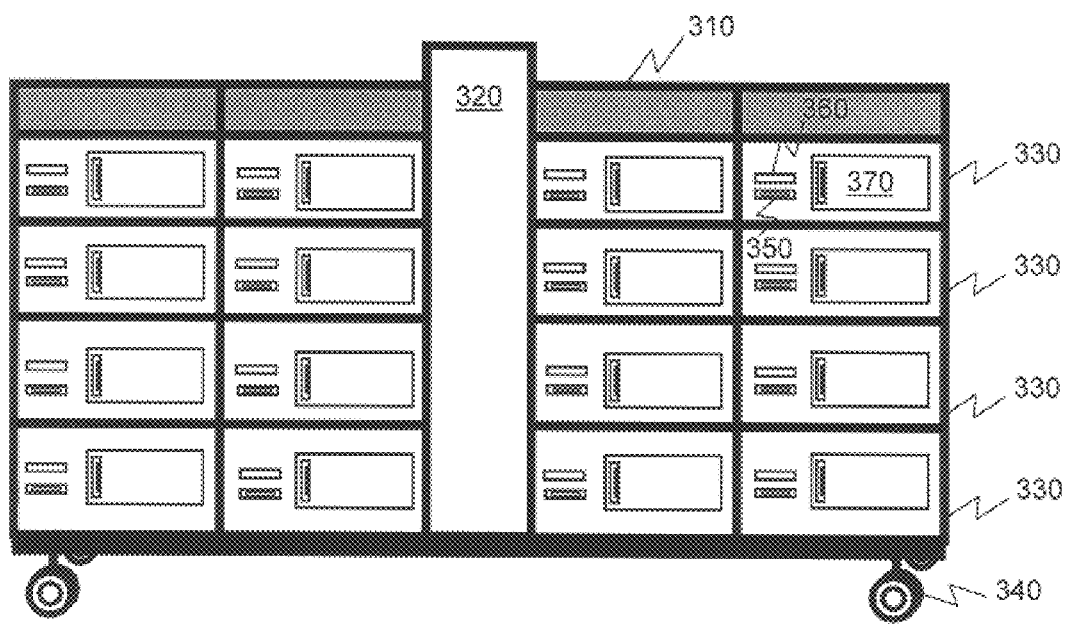
FIG. 3 is a diagram of a public telephone bank consistent with the present invention.

FIG. 3 is a diagram of a public telephone bank 300 consistent with the present invention. The telephone bank 300 includes a housing 310, a central communication unit 320, and several phone units 330. The housing 310 optionally includes wheels 340 to facilitate movement of the telephone bank 300. The central communication unit 320 connects the phone units 330 to a public telephone network.

Each of the phone units includes a card reader 350, a display 360, and a compartment with a locking mechanism 370. The card reader 350 receives and validates a card, such as a credit card, a prepaid calling card, etc., from a caller. In one implementation, the card reader 350 operates in combination with an external apparatus to validate the caller's card. In yet other implementations, an external apparatus alone performs the validation.

The display 360 includes, for example, a liquid crystal display (LCD) that provides messages to the caller, such as messages indicating whether the caller's card is valid. The compartment houses a telephone handset (not shown) and the locking mechanism 370 provides access to the handset upon the occurrence of certain conditions, such as when the card reader 350 determines that the caller's card is valid and when the telephone handset contains a sufficient charge.

Figure 4:
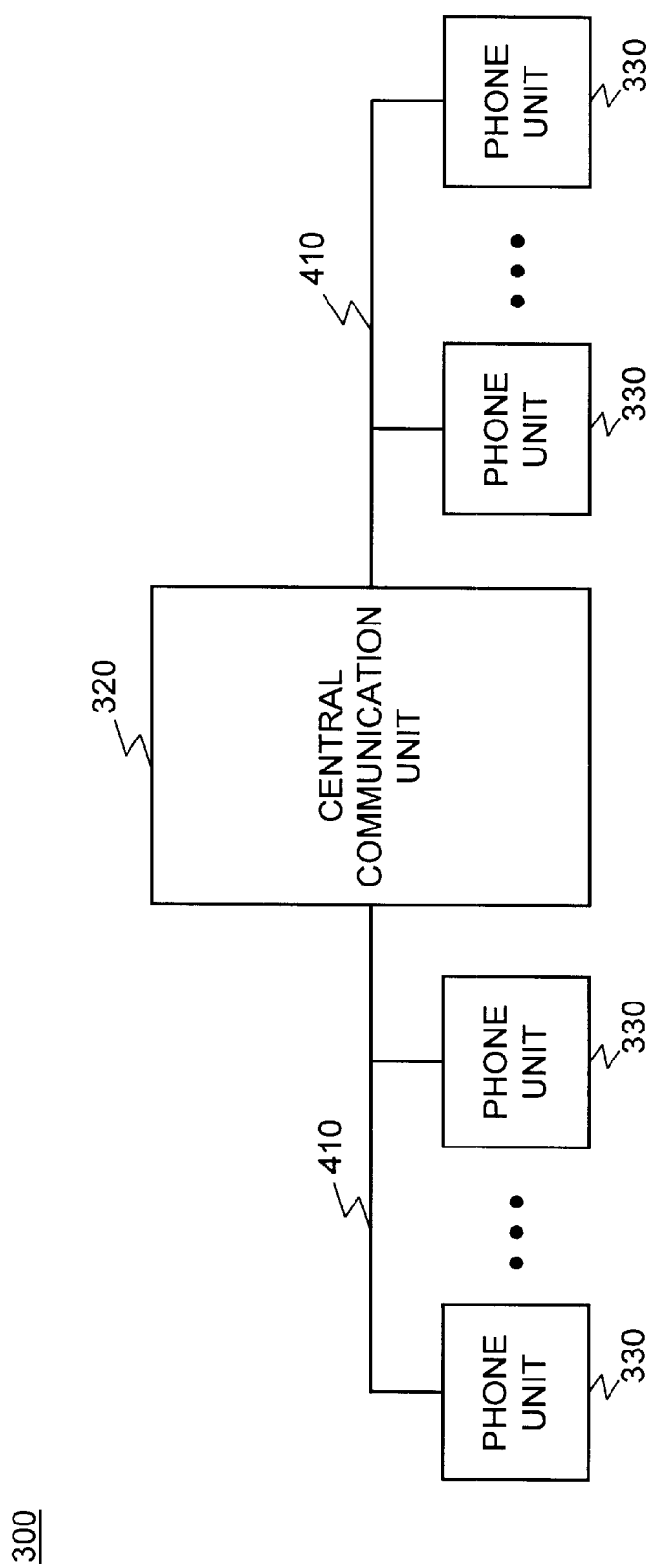
FIG. 4 is a detailed diagram of the public telephone bank of FIG. 3.

FIG. 4 is a detailed diagram of the telephone bank 300. The telephone bank 300 includes central communication unit 320 and several phone units 330 connected via one or more buses 410. The communication unit 320 and phone units 330 communicate via the bus(es) 410 using time division multiple access (TDMA) communication in a manner well known to one skilled in the art.

EXEMPLARY COMMUNICATION UNIT

Figure 5:
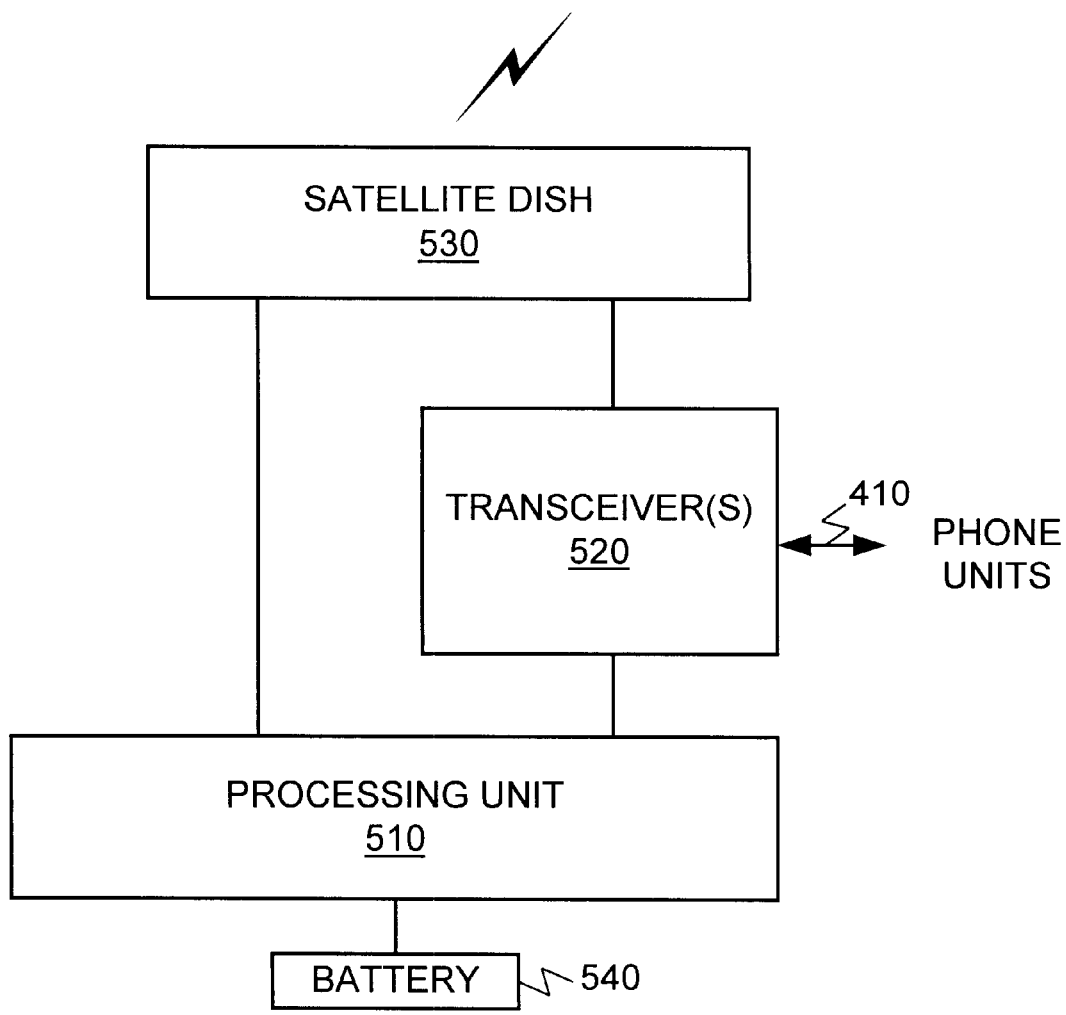
FIG. 5 is an exemplary diagram of the central communication unit of FIG. 4.

FIG. 5 is an exemplary diagram of the central communication unit 320. The communication unit 320 includes a processing unit 510, one or more transceivers 520, a satellite dish 530, and a battery 540. The processing unit 510 includes a standard microprocessor or microcontroller that controls the operation of the communication unit 320. The processing unit 510 also controls the communication between the telephone bank 300 and the public telephone network, including all necessary conversions of the signals.

The transceiver(s) 520 include receivers and transmitters that communicate with the phone units 330 over the bus(es) 410. The satellite dish 530 includes conventional technology for communicating with one or more stationary or orbiting satellites (not shown). In alternative implementations, the satellite dish 530 is replaced with conventional technology for communicating with a cellular network or the Internet. In either event, the communication unit 320 may use multiplexing technology to concurrently transmit multiple telephone signals.

The battery 540 includes a large-capacity rechargeable battery that provides all operating power for the communication unit 320. The battery 540 also includes a connection (not shown) for a standard electrical outlet. This connection may provide the primary power to the communication unit 320 when an electrical outlet is available, and may provide power for recharging the battery 540.

EXEMPLARY PHONE UNIT

Figure 6:
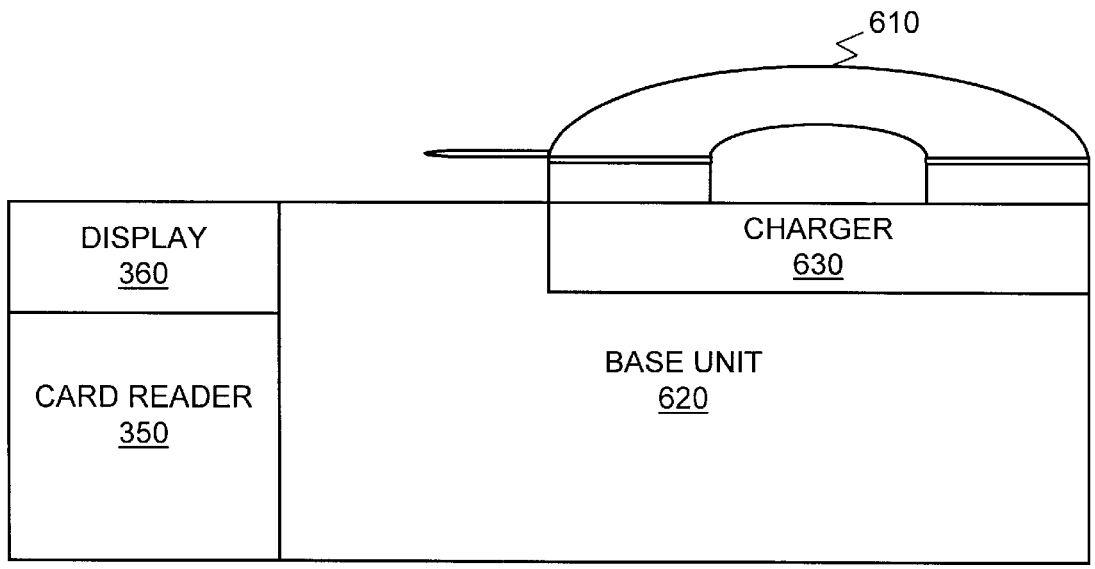
FIG. 6 is an exemplary diagram of the phone unit of FIG. 4.

FIG. 6 is an exemplary diagram of a phone unit 330. The phone unit 330 includes a portable handset 610, a base unit 620 having a battery charger 630, a card reader 350, and a display 360. In this implementation, the handset 610 includes a cordless telephone. As described below, the handset may alternatively include a wireless or disposable telephone.

Figure 7:
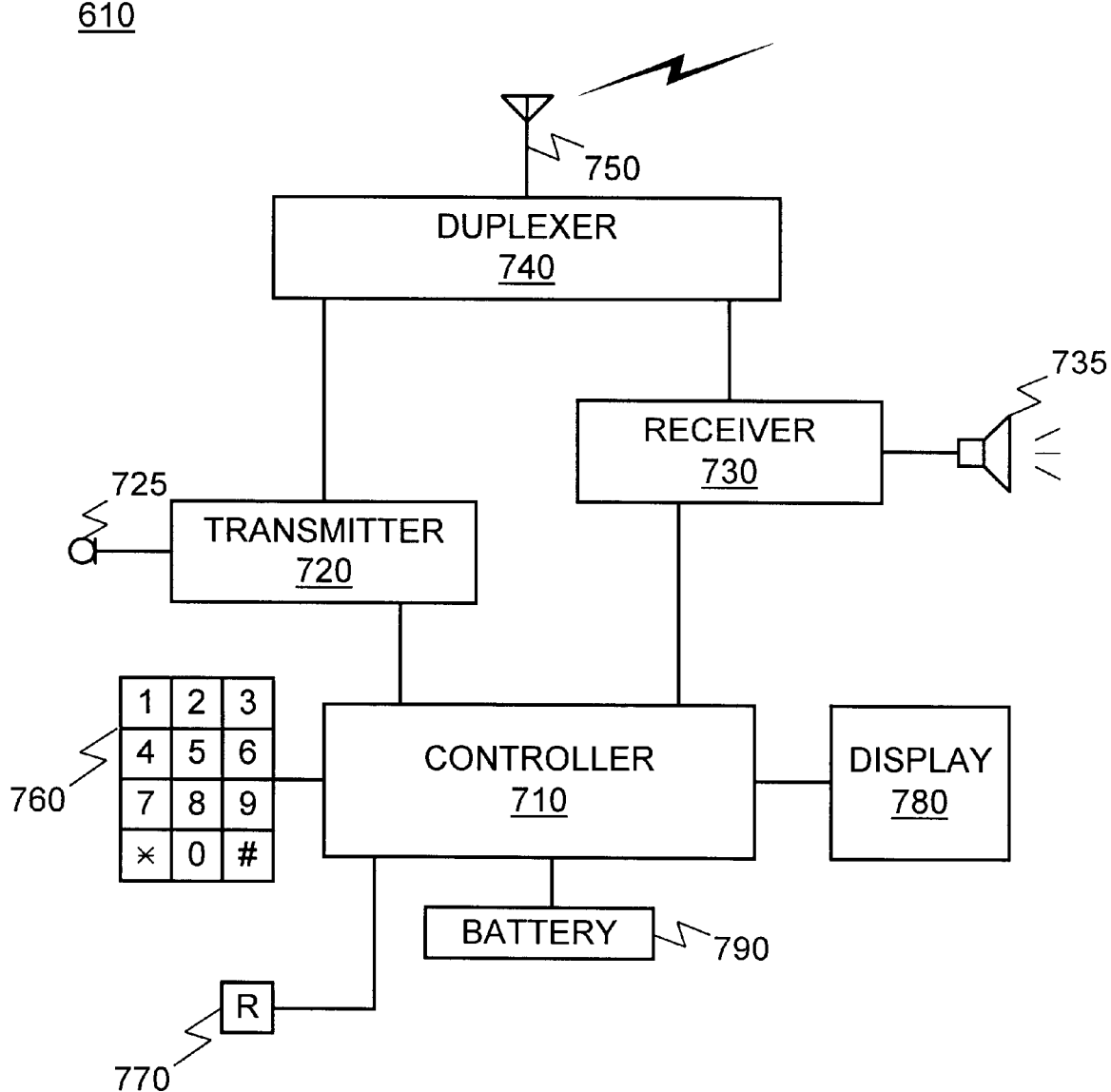
FIG. 7 is an exemplary diagram of the handset of FIG. 6.

FIG. 7 is an exemplary diagram of the handset 610. The handset 610 includes a controller 710, a transmitter 720 connected to a microphone 725, a receiver 730 connected to a speaker 735, a duplexer 740, an antenna 750, a keypad 760, a reset button 770, a display 780, and a battery 790. The controller 710 includes a conventional microprocessor or microcontroller that controls the operation of the handset 610 and performs telephone operations standard in today's telephones.

The transmitter 720 includes a radio frequency (RF) transmitter that modulates voice signals received by the microphone 725 and transmits the modulated signals to the base unit 620 (FIG. 6) via the duplexer 740. The receiver 730 includes an RF receiver that demodulates voice signals received by the duplexer 740 from the base unit 620 and provides these signals to the speaker 735.

The duplexer 740 permits the transmitter 720 and the receiver 730 to communicate with the base unit 620 concurrently. The duplexer 740 communicates with the base unit 620 over an assigned frequency channel using the antenna 750. The frequency channel used by the duplexer 740 may vary for each of the phone units 330 to avoid interference and competition for available channels.

The keypad 760 includes a conventional telephone keypad for generating dual-tone multi-frequency (DTMF) tones corresponding to an entered telephone number and for controlling a function of the controller 710. The reset button 770 controls initiation of a new telephone call by sending a signal to the controller 710. The display 780 includes, for example, an LCD display that provides messages to the caller, such as messages indicating a status of the battery, identifying the dialed telephone number, etc. The battery 790 includes a rechargeable battery that provides all of the operating power for the handset 610.

Figure 8:
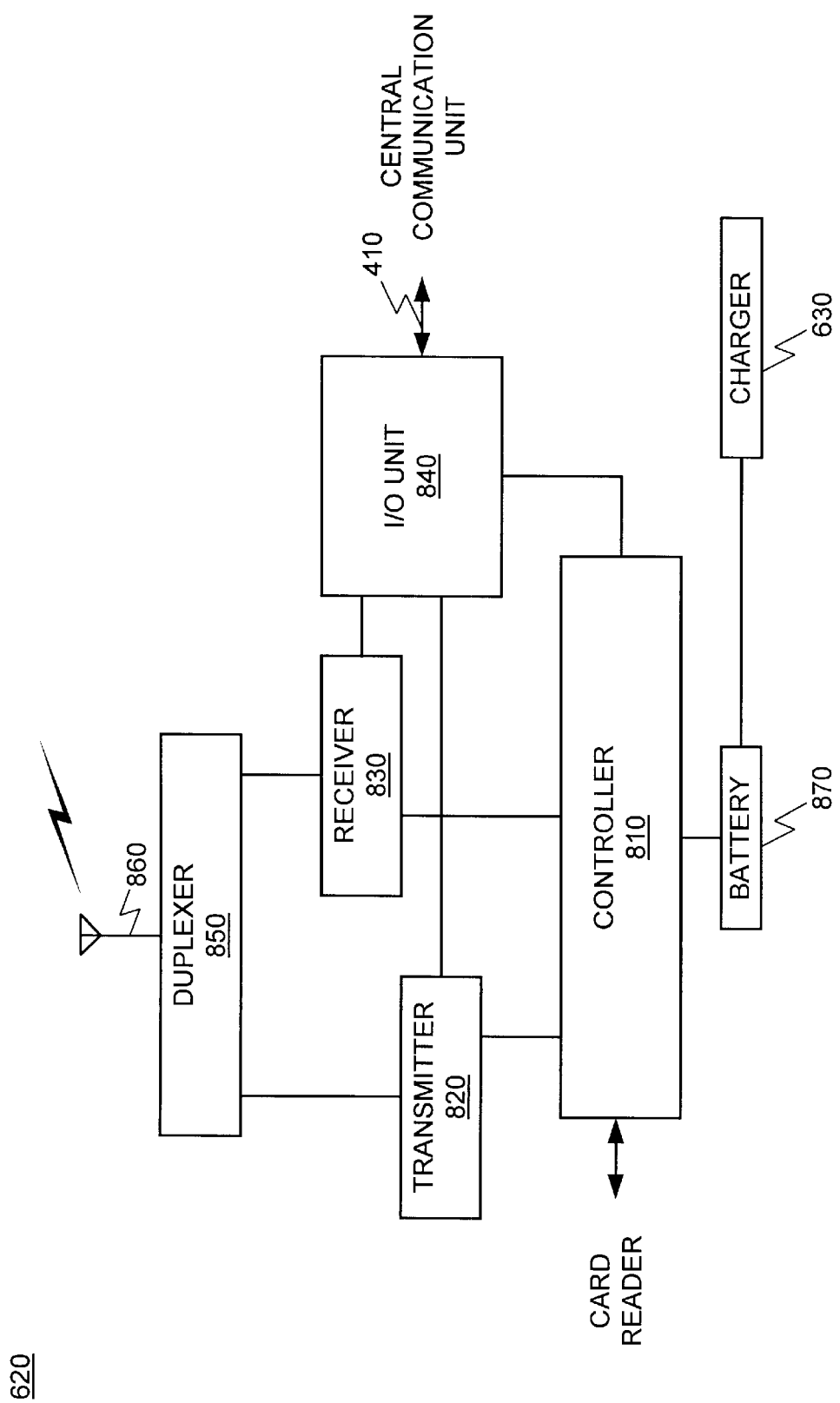
FIG. 8 is an exemplary diagram of the base unit of FIG. 6.

Returning to FIG. 6, the base unit 620 provides a communication interface to the handset 610. FIG. 8 is an exemplary diagram of the base unit 620. The base unit 620 includes a controller 810, a transmitter 820, a receiver 830, an input/output (I/O) unit 840, a duplexer 850, an antenna 860, a battery 870, and a battery charger 630.

The controller 810 includes a conventional microprocessor or microcontroller that controls the operation of the base unit 620. The controller 810 also detects the strength of the signals received from the handset 610. The signal strength reflects the distance from the telephone bank 300 at which the handset 610 is located. As described in more detail below, the controller 810 uses this information for theft detection.

The transmitter 820 includes an RF transmitter that modulates voice signals received by the central communication unit 320 (FIG. 3) and transmits the modulated signals to the handset 610 via the duplexer 850. The receiver 830 includes an RF receiver that demodulates voice signals received by the duplexer 850 from the handset 610 and provides these signals to the communication unit 320. The I/O unit 840 facilitates communication between the transmitter 820 and receiver 830 and the communication unit 320. The I/O unit 840 converts signals for transmission across bus 410, and vice versa.

The duplexer 850 permits the transmitter 820 and the receiver 830 to communicate with the handset 610 concurrently. The duplexer 850 communicates with the handset 510 over an assigned frequency channel using the antenna 860. As described above, the frequency channel used by the duplexer 850 may vary for each of the phone units 330 to avoid interference and competition for available channels.

The battery 870 includes a large-capacity, rechargeable battery that provides all of the operating power for the base unit 620. The battery 870 also includes a connection (not shown) to the battery 540 of the communication unit 320 and/or the electrical outlet connection of the communication unit 320. The battery 870 connects to the charger 630. When connected, the charger 630 charges the battery 790 of the handset 610.

EXEMPLARY COMMUNICATIONS SYSTEM

Figure 9:
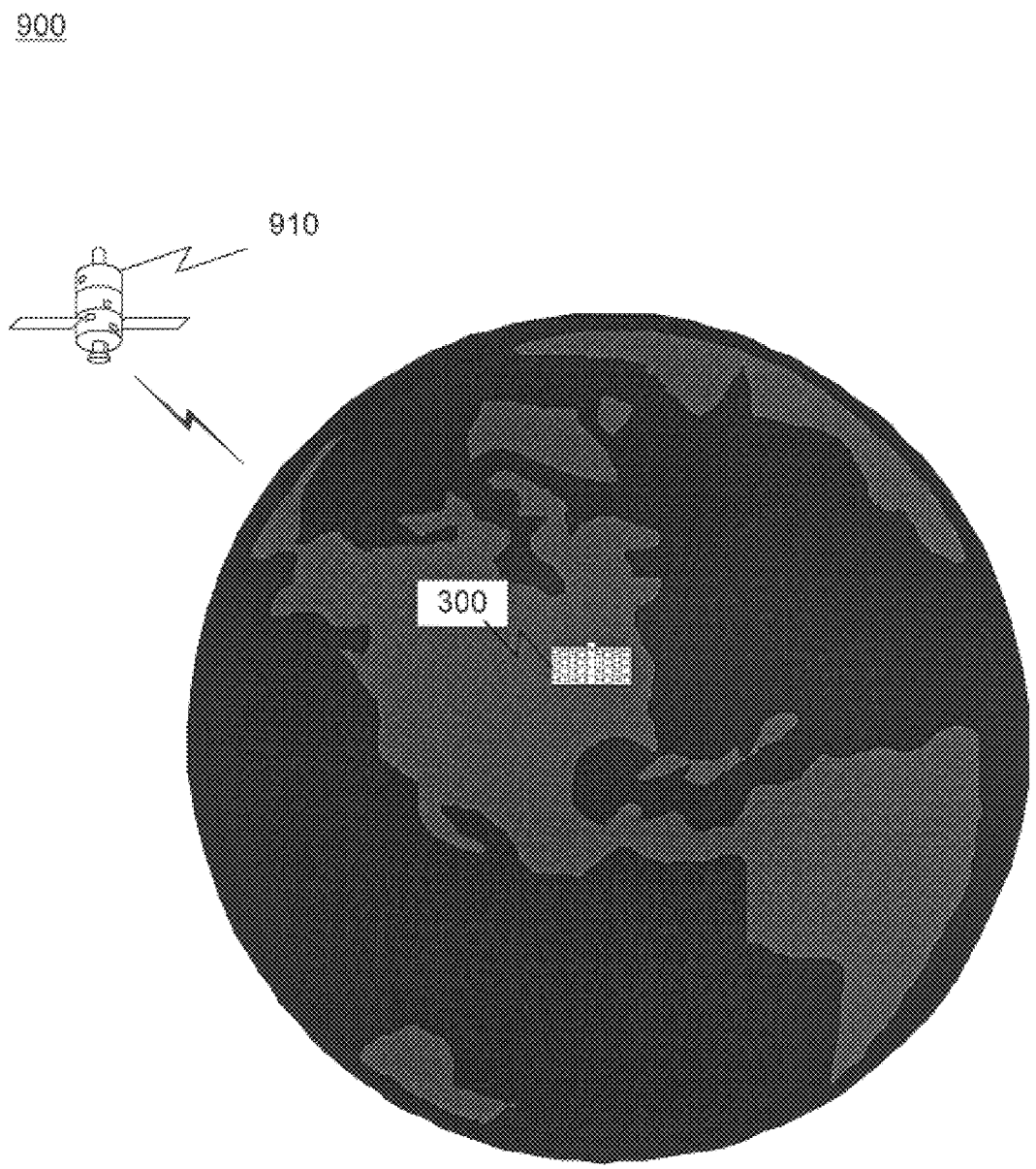
FIG. 9 is a diagram of a communications system, consistent with the present invention, that employs the public telephone bank of FIG. 3.

FIG. 9 is an exemplary diagram of a communications system 900, consistent with the present invention, in which the telephone bank 300 operates. The communications system 900 includes the telephone bank 300 and at least one satellite 910. The satellite 910 orbits the earth in an orbiting plane, but may alternatively be stationary. For purposes of this description, the position of the telephone bank 300 remains relatively fixed at any given time, while the satellite 910 continuously moves about the earth.

Figure 10A:
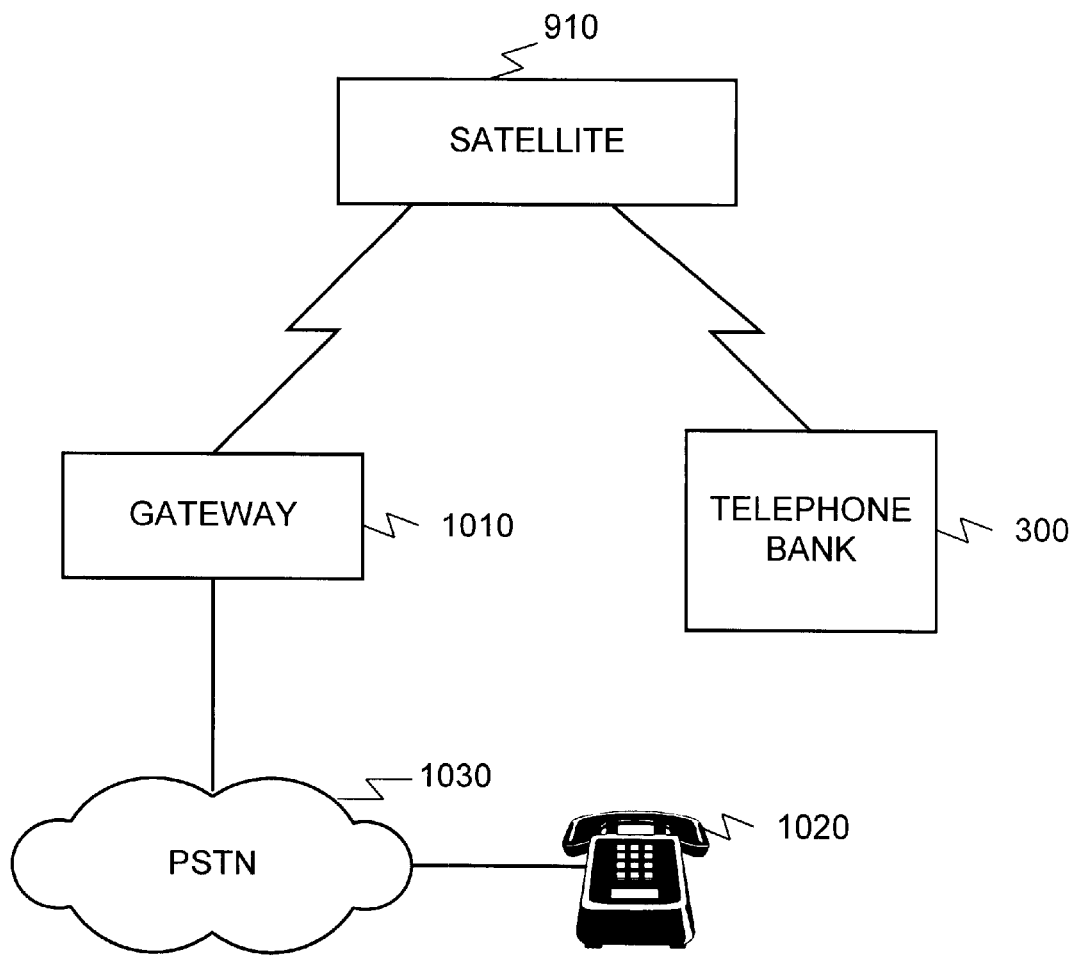
FIG. 10A is a detailed diagram of the communications system of FIG. 9.

FIG. 10A is a detailed diagram of the communications system 900. In addition to the telephone bank 300 and satellite 910, the communications system 900 includes a gateway 1010 connected to telephone equipment 1020 via the public switched telephone network (PSTN) 1030. The gateway 1010 includes circuitry for connecting to the PSTN 1030. The gateway 1010 converts signals received from the satellite 910 to a form appropriate for transmission through the PSTN 1030, and vice versa.

Figure 10B:
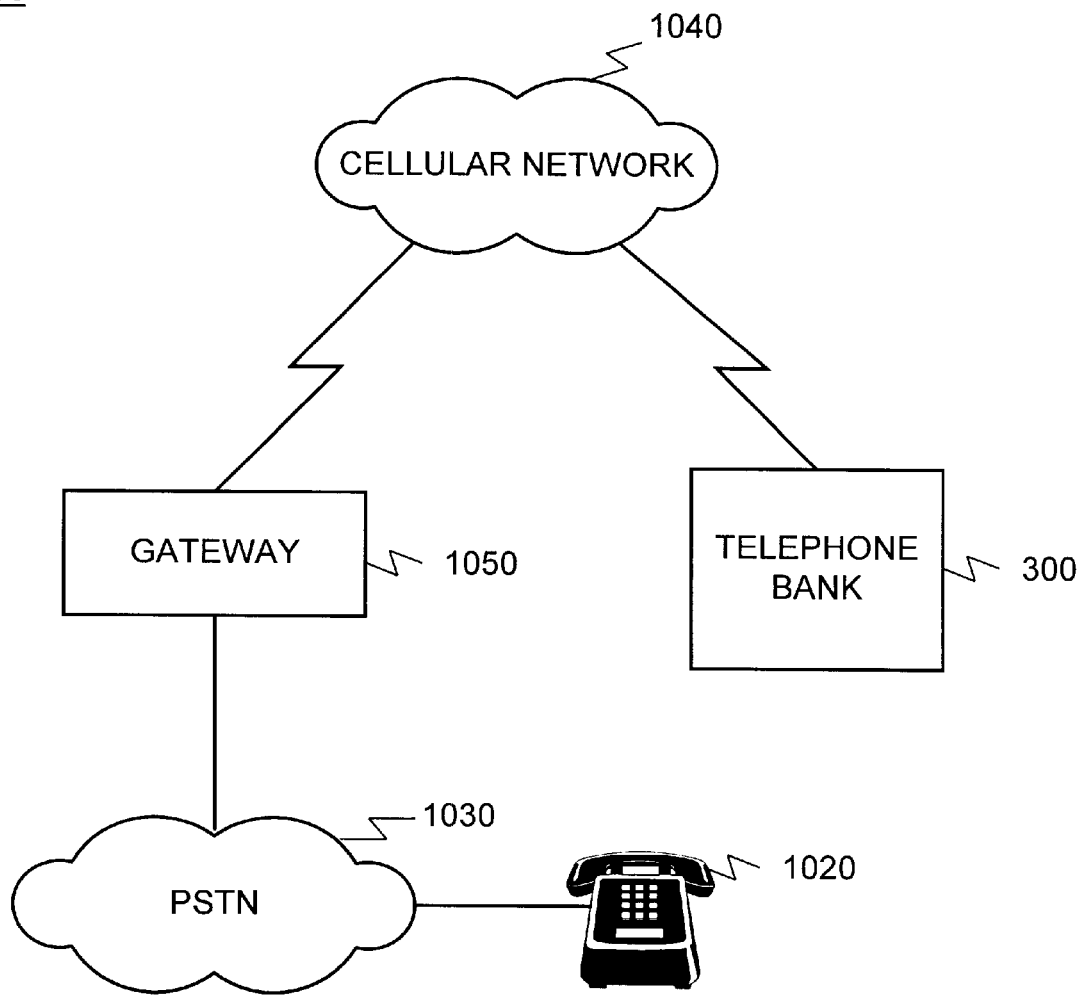
FIG. 10B is a detailed diagram of an alternative implementation of the communications system of FIG. 9.

FIG. 10B is a detailed diagram of an alternative implementation of the communications system 900. In this implementation, the telephone bank 300, or the phone units 330 or the handsets 610 within the telephone bank 300, communicates with the PSTN 1030 via a cellular network 1040 and a gateway 1050. The cellular network 1040 may be any conventional cellular network, such as a Code Division Multiple Access (CDMA) network. The gateway 1050 includes circuitry for converting signals from the cellular network 1040 to a form appropriate for transmission through the PSTN 1030, and vice versa.

Figure 10C:
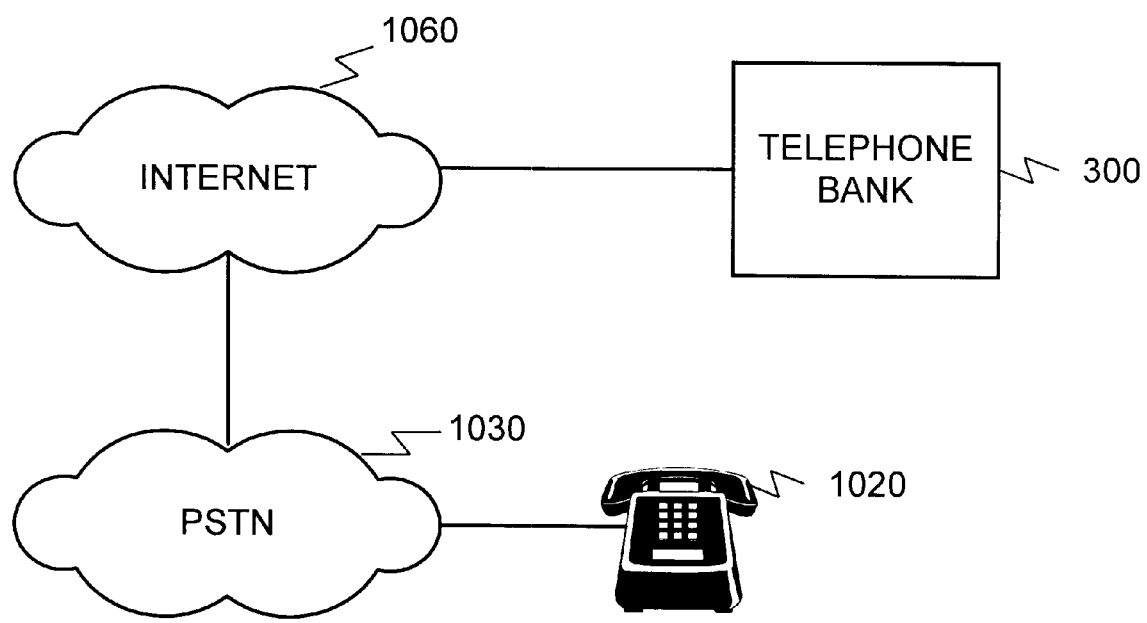
FIG. 10C is a detailed diagram of another alternative implementation of the communications system of FIG. 9.

FIG. 10C is a detailed diagram of another alternative implementation of the communications system 900. In this implementation, the telephone bank 300 contains a high-speed data connection, such as a T1 connection, to the Interriet 1060. The Internet 1060, in turn, connects to the PSTN 1030. The telephone bank 300 may use conventional Voice Over Internet Protocol technology to transmit telephone signals through the Internet 1060.

EXEMPLARY CALL PROCESSING

Figure 11A:
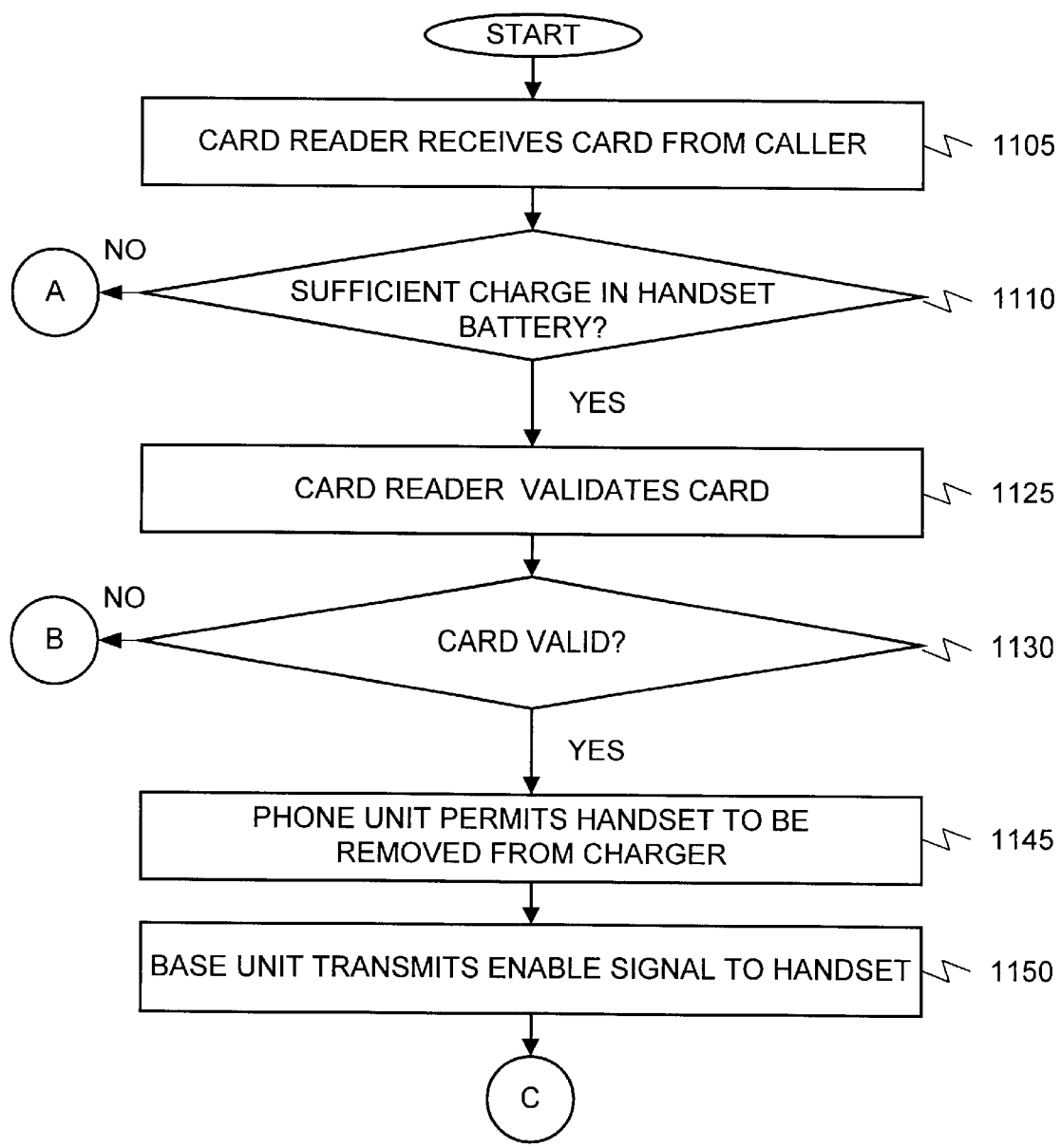
FIGS. 11A, 11B, 11C, and 11D are flowcharts of call processing consistent with the present invention.

FIGS. 11A–11D are flowcharts of call processing consistent with the present invention. When a caller desires to place a call using the public telephone bank 300, the caller inserts a card, such as a credit card, into the card reader 350. The card reader 350 accepts the card from the caller [step 1105] (FIG. 11A).

Figure 11B:
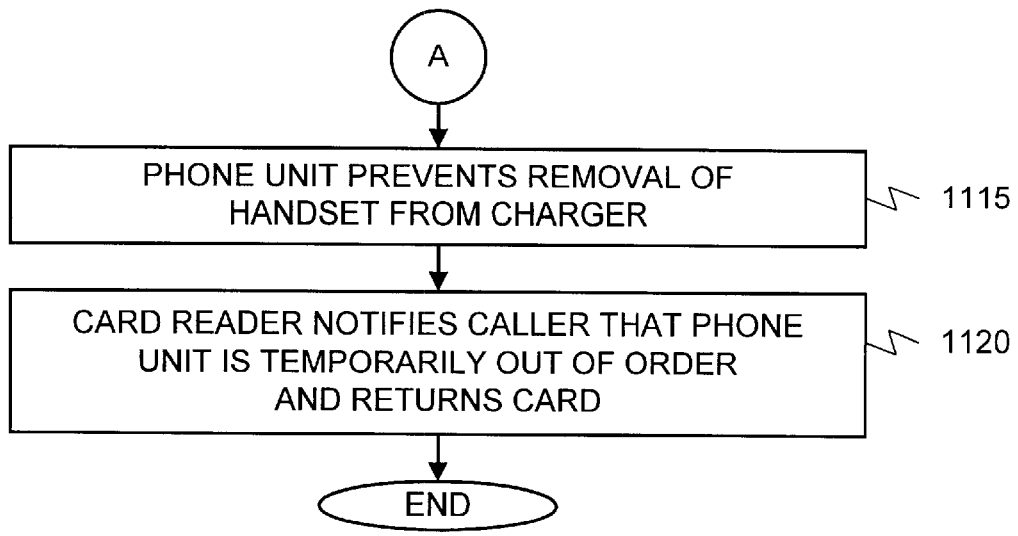

The phone unit 330 determines whether the battery 790 in the handset 610 contains a sufficient charge [step 1110]. The phone unit 330 might do this by simply comparing the remaining charge in the battery 790 against a predetermined threshold. The threshold might be set to a level that supports a certain time period for a telephone call. If the battery 790 contains an insufficient remaining charge, the phone unit 330 prevents removal of the handset 610 through operation of the locking mechanism 370 [step 1115] (FIG. 11B). The card reader 350 then notifies the caller that the phone unit 330 is temporarily out of order and returns the caller's card [step 1120]. The card reader 350 may notify the caller by displaying an "OUT OF ORDER-PHONE CHARGING" message on display 360. Of course, steps 1110–1120 may occur prior to step 1105.

Figure 11C:
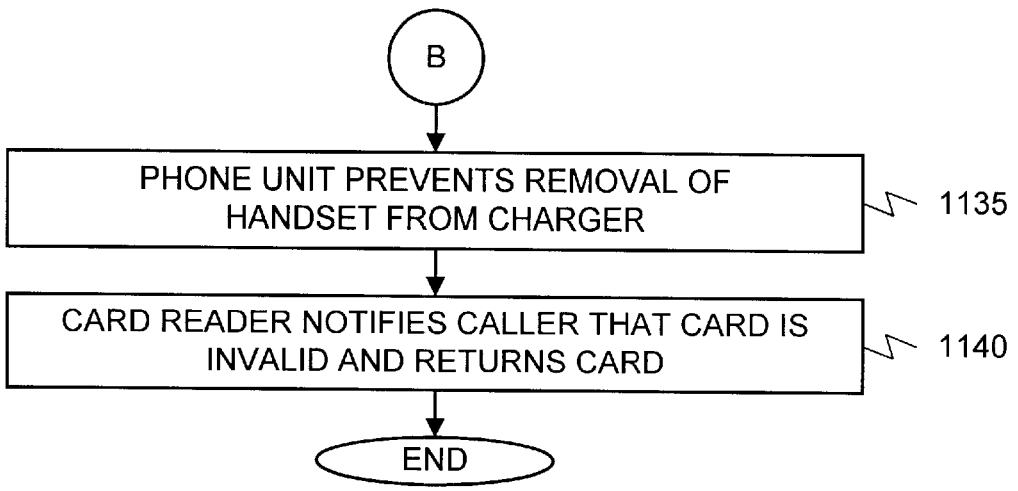

When the battery 790 contains a sufficient remaining charge, the card reader 350 (with or without the aid of an external apparatus) validates the caller's card [step 1125] (FIG. 11A). If the card reader 350 determines that the caller's card is invalid [step 1130], the phone unit 330 prevents removal of the handset 610 using the locking mechanism 370 [step 1135] (FIG. 11C). The card reader 350 then notifies the caller that the card is invalid and returns the card [step 1140]. The card reader 350 may notify the caller by displaying a "CARD INVALID" message on display 360.

When the card reader 350 determines that the caller's card is valid [step 1130] (FIG. 11A), the phone unit 330 permits the handset 610 to be removed possibly by unlocking the locking mechanism 370 [step 1145]. Once the caller removes the handset 610 from its compartment, the base unit 620 detects the removal and transmits an enable signal to the handset 610 [step 1150].

Figure 11D:
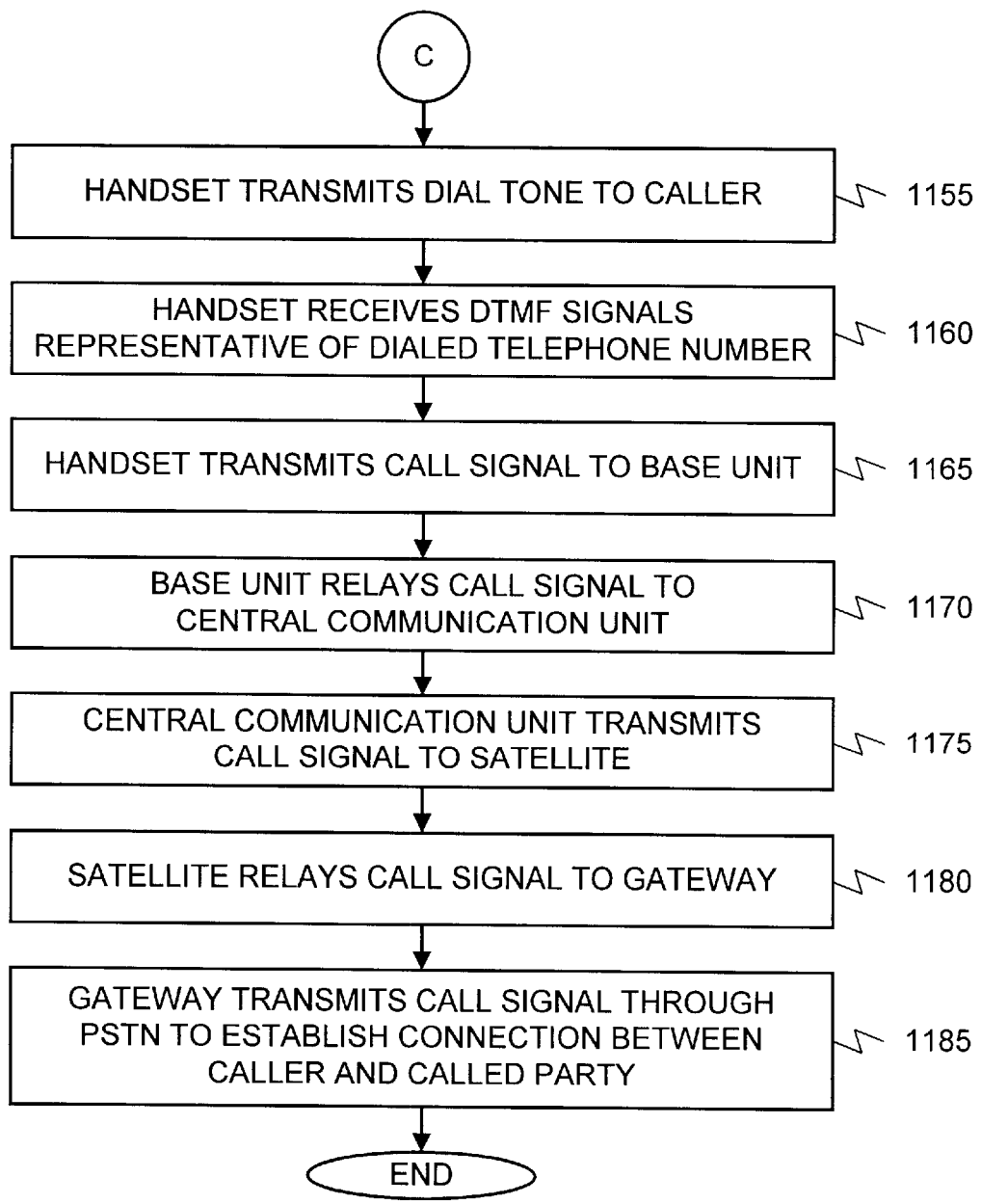

In response to the enable signal, the handset 610 transmits a dial tone to the speaker 735 to inform the caller that the telephone is ready for use [step 1155] (FIG. 11D). Of course, the handset 610 may use other audio or visual notification mechanisms. In any event, the caller enters a desired telephone number through use of the keypad 760. The controller 710 within the handset 610 receives the DTMF signals representative of the dialed telephone number from the keypad 760 [step 1160]. The controller 710 then generates a call signal and transmits it to the base unit 620 via the duplexer 740 [step 1165].

The base unit 620 relays the call signal to the central communication unit 320 [step 1170]. The communication unit 320 converts the call signal to an appropriate form and transmits it to satellite 910 using the satellite dish 530 [step 1175]. The satellite 910 relays the call signal to gateway 1010 via a transmission beam [step 1180]. The gateway 1010 converts the signal for transmission to a called party terminal, such as telephone equipment 1020, over the PSTN 1030 [step 1185]. The PSTN 1030 completes the connection to the called party so that vocal communication can take place between the caller and the called party over the established channel.

EXEMPLARY CALL TERMINATION PROCESSING

Figure 12:
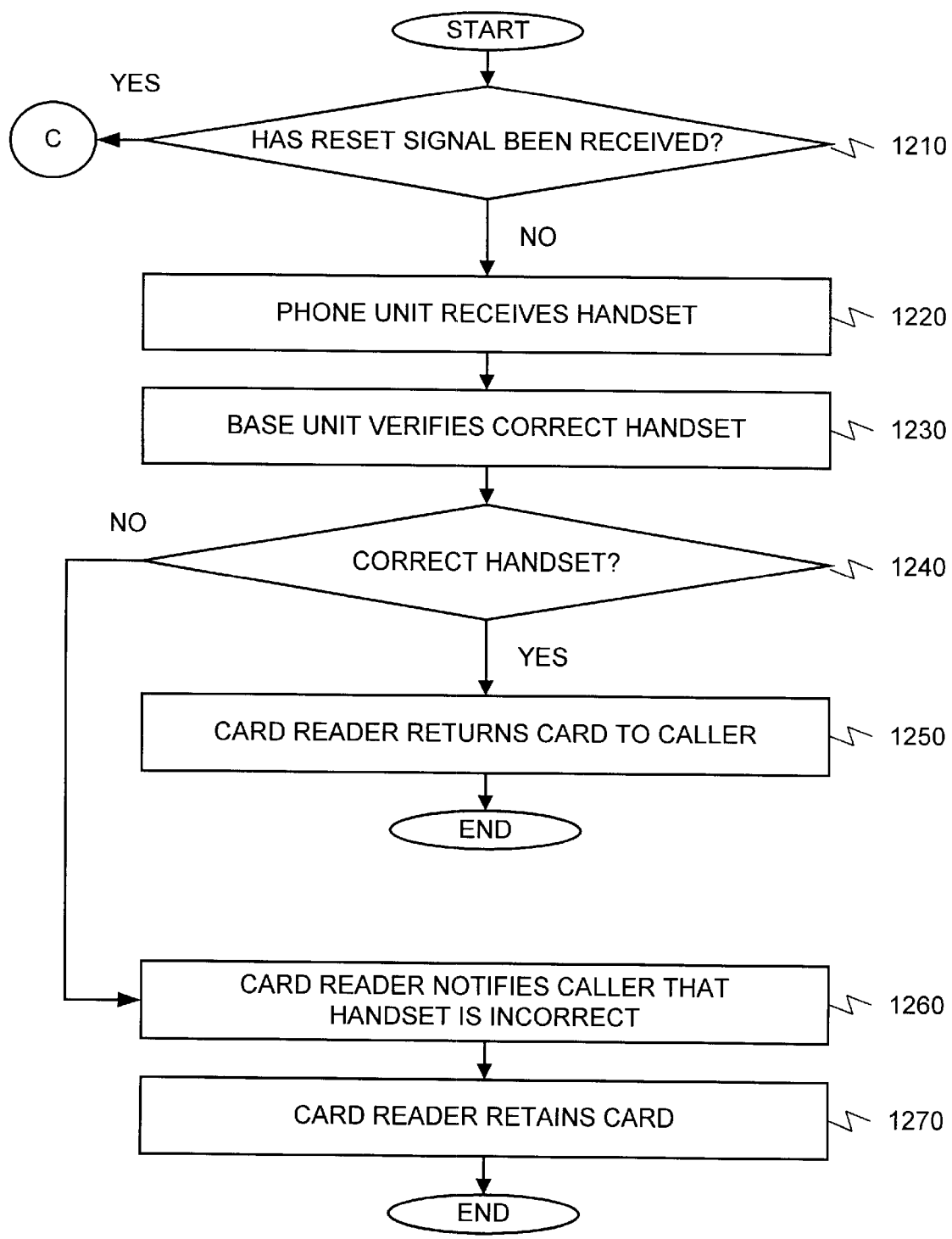
FIG. 12 is a flowchart of call termination processing consistent with the present invention.

FIG. 12 is a flowchart of call termination processing consistent with the present invention. Upon completion of the telephone call, the caller may desire to immediately place another call. If so, the caller presses the reset button 770 on the handset 610 [step 1210]. In this case, the processing returns to step 1155 in FIG. 11D.

If the caller does not desire to place another call, the caller returns the handset 610 to the charger 630 in the phone unit 330 [step 1220]. When the phone unit 330 receives the handset 610, the base unit 620 verifies that the correct handset has been returned [step 1230]. This verification addresses the potential problem of a caller returning a handset to the wrong phone unit.

The base unit 620 might perform the verification by transmitting a verification signal to the handset 610 and awaiting an acknowledge signal. Because each handset 610 and base unit 620 combination communicates on a different channel, the base unit 620 would only receive an acknowledge signal from the correct handset. Therefore, a lack of receipt of an acknowledge signal within a predetermined time period would indicate that an incorrect handset 610 has been returned.

If the correct handset 610 has been returned [step 1240], the card reader 350 returns the card to the caller [step 1250]. If the correct handset 610 has not been returned [step 1240], however, the card reader 350 notifies the caller that the handset is incorrect [step 1260]. The card reader 350 might perform this notification by displaying a "WRONG PHONE UNIT-PLEASE RETURN TO LOCATION 15" on the display 360 (assuming that the correct phone unit was labeled No. 15). In this case, the card reader 350 retains the card it is holding [step 1270].

EXEMPLARY THEFT PREVENTION PROCESSING

Figure 13:
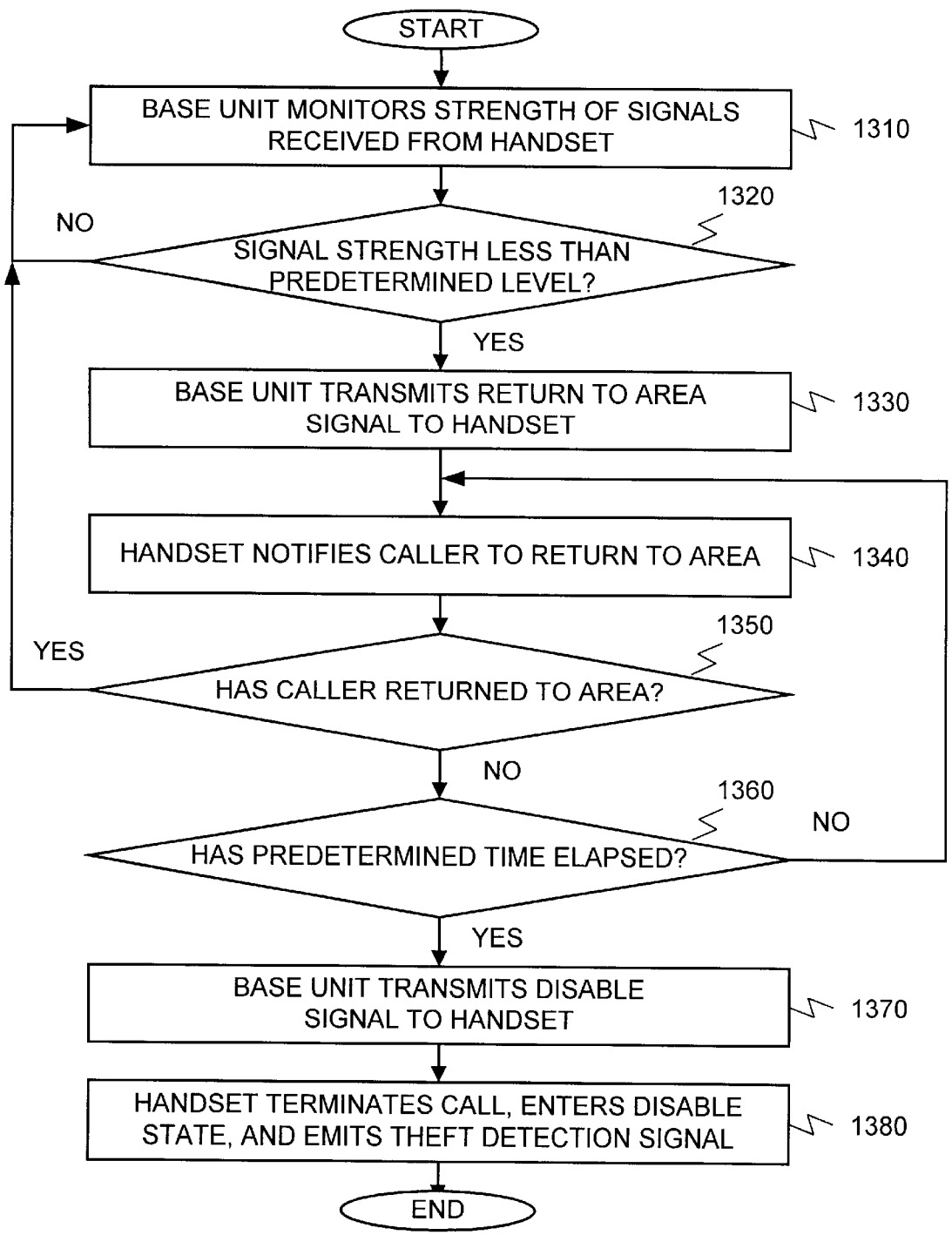
FIG. 13 is a flowchart of theft prevention processing consistent with the present invention.

FIG. 13 is a flowchart of theft prevention processing consistent with the present invention. To minimize theft, the telephone bank 300 permits its handsets to be used only within a predetermined distance of its location. When a caller removes a handset 610 from the phone unit 330, the base unit 620 begins monitoring the strength of the signals received from the handset 610 [step 1310]. The base unit 620 compares the strength of the received signals against a predetermined threshold [step 1320]. If the signal strength is greater than the threshold, the base unit 620 continues its monitoring [step 1310].

If the signal strength falls below the threshold, the base unit 620 transmits a return_to_area signal to the handset 610 [step 1330]. When the handset 610 receives the signal, it notifies the caller to return to the telephone bank 300 [step 1340]. The handset 610 might make the notification by displaying a message on its display 780 (FIG. 7) or by outputting an audible message through its speaker 735.

If the caller returns to the telephone bank area as determined by the signal strength of signals received from the handset 610, the base unit 620 discontinues the tra nsmission of the retun-to-area signal and continues its monitoring of t he signals from the handset 510 [step 13 10]. If the caller fails to return to the area, the base unit 620 determines whether a predetermined time limit has elapsed [step 1360]. If the time limit has not elapsed, the handset 610 continues to notify the caller to return to the area [step 1340].

If the time limit has elapsed and the caller has not returned to the area, the base unit 620 transmits a disable signal to the handset 610 [step 1370]. In response to the disable signal, the handset 610 terminates the telephone call, enters a disable state in which the caller cannot place any further calls, and emits a theft_detection signal [step 1380]. The theft_detection signal includes a loud audible warning emitted through the speaker 735, for example, or a combination of visual and audible warnings that indicate that the caller may be trying to steal the handset 610. The warning may be loud enough to be heard by others in the immediate area of the caller.

The systems and methods consistent with the present invention provide a portable bank of public telephones that provides public telephone service to locations previously unavailable due to their lack of public telephone access facilities.

The foregoing description of preferred embodiments of the present invention provides illustration and description, but is not intended to be exhaustive or to limit the invention to the precise form disclosed. Modifications and variations are possible in light of the above teachings or may be acquired from practice of the invention. The scope of the invention is defined by the claims and their equivalents.

For example, for security reasons, the caller may be required to enter a PIN number that the card reader, or an external mechanism, verifies before a telephone call will be permitted. The PIN number entered by the caller may be compared with a PIN number encrypted on the card or compared with previously-stored PIN numbers in a database.

In addition, the preceding description described the handset as a cordless telephone. The invention is equally applicable to wireless or disposable telephones. In these cases, the handset may communicate directly with the satellite or a cellular network possibly without the need to go through a base unit or a central communications unit. In the case of disposable telephones, the card reader may return the caller's card after billing the card for a predetermined amount and the telephones may be permitted to roam outside the area of the portable telephone bank because the caller will not be required to return the telephone.

What is claimed is:

1. A portable telephone bank, comprising:
   a plurality of public telephone units that permit callers to place telephone calls, each of the telephone units including a portable handset that permits a caller to roam within a predetermined range of the portable telephone bank; and
   a central communication unit, connected to the telephone units, that transmits communication signals from the telephone units to a public telephone network via wireless communication channels.

2. The portable telephone bank of claim 1, wherein each of the telephone units further includes:
   a card reader that receives and validates a card from a caller as payment for placing a telephone call, and
   a base unit that relays the communication signals between the handset and the central communication unit.

3. The portable telephone bank of claim 2, wherein the card reader operates in conjunction with an external apparatus to validate the card.

4. The portable telephone bank of claim 2, wherein the card reader includes:
   an external apparatus that validates the card.

5. The portable telephone bank of claim 2, wherein each of the telephone units further includes:
   a compartment that houses the handset when inactive, the compartment permitting access to the handset only when the card reader determines that the card is valid.

6. The portable telephone bank of claim 1, wherein the handset includes a cordless telephone handset.

7. The portable telephone bank of claim 1, wherein the central communication unit includes:
   a satellite communicator that communicates with the public telephone network over the wireless communication channels via at least one satellite.

8. The portable telephone bank of claim 1, wherein the central communication unit includes:
   a battery that provides all operating power to the portable telephone bank.

9. A method for communicating with a public telephone network using a portable telephone bank including a plurality of public telephones and a central communication unit connected to the public telephone network via a wireless communication channel, each of the public telephones includes a portable handset, the method comprising:
   receiving a card as payment for a telephone call;
   notifying that the handset is ready for use;
   placing the call using the handset;
   receiving the handset at completion of the call;
   determining whether the received handset is a correct handset; and
   returning the card when the received handset is the correct handset.

10. The method of claim 9, wherein the placing the call includes:
    receiving call signals at the handset,
    sending the call signals to the central communication unit, and
    relaying the call signals to the public telephone network via the wireless communication channel.

11. The method of claim 9, further comprising:
    determining whether the card is valid.

12. The method of claim 11, wherein the notifying that the handset is ready for use includes:
    producing a notification signal only when the card is determined to be valid.

13. The method of claim 11, further comprising:
    permitting removal of the handset only when the card is determined to be valid.

14. The method of claim 9, further comprising:
    detecting when the handset leaves a predetermined area; and
    emitting a warning from the handset when the handset leaves the predetermined area.

15. The method of claim 14, wherein the detecting includes:
    monitoring, at the central communication unit, a strength of call signals from the handset,
    comparing the call signal strength to a predetermined threshold, and
    determining that the handset has left the predetermined area when the call signal strength is below the predetermined threshold.

16. A public telephone system connected to a public telephone network via at least one satellite and a gateway connected to the at least one satellite by a wireless communication channel and to the public telephone network by a wireline communication channel, the system comprising:
    a plurality of public telephones that permit callers to place telephone calls, each of the public telephones including a portable handset that permits a caller to roam within a predetermined range; and
    a central communication unit, connected to the public telephones and the at least one satellite, that transmits communication signals between the public telephones and the public telephone network via the at least one satellite and the gateway.

17. A portable telephone bank, comprising:
    a plurality of public telephones that permit callers to place telephone calls, each of the public telephones including
        a cordless handset that permits a caller to roam within a predetermined range of the portable telephone bank,
        a card reader that receives a card from a caller as payment for placing a telephone call, and
        a base unit that communicates directly with the cordless handset; and
    a central communication unit, connected to the base units, that transmits communication signals from the public telephones to a public telephone network, the central communication unit including
 a satellite communicator that communicates with the public telephone network over wireless communication channels via at least one satellite, and
 a battery that provides operating power to the portable telephone bank.

18. A portable telephone bank, comprising:

a plurality of public telephones that permit callers to place telephone calls, each of the public telephones including
 a portable handset that permits a caller to roam within a predetermined range of the portable telephone bank,
 a card reader that receives a card from a caller as payment for placing a telephone call, and
 a base unit that communicates directly with the portable handset; and a central communication unit, connected to the base units, that transmits communication signals from the public telephones to a public telephone network via a high-speed data link.

19. The portable telephone bank of claim 18, wherein the high-speed data link communicates with the public telephone network via the Internet.

20. A portable bank of public telephones, comprising:

a plurality of card readers that receive and validate cards from callers as payment for placing telephone calls;

a plurality of wireless handsets, corresponding to the card readers, that communicate with a cellular network via wireless communication channels and that permit callers to roam within a predetermined range of the portable telephone bank;

a plurality of handset compartments, corresponding to the handsets, that permit a corresponding one of the handsets to be removed by a caller when the corresponding card reader determines that the card from the caller is valid; and a battery that provides operating power to the portable telephone bank.

21. The portable telephone bank of claim 20, wherein each of the card readers operates in conjunction with an external apparatus to validate the card.

22. The portable telephone bank of claim 20, wherein each of the card readers includes:

an external apparatus that validates the card.

23. A portable bank of public telephones, comprising:

a payment receiver that receives and validates payment from callers for placing telephone calls;

a plurality of disposable handsets that communicate with a cellular network via wireless communication channels and that permit callers to roam during the telephone calls; and a plurality of handset compartments that permit the handsets to be removed by callers when the payment receiver determines that the payment from the callers is valid.

* * * * *